Figure 1:
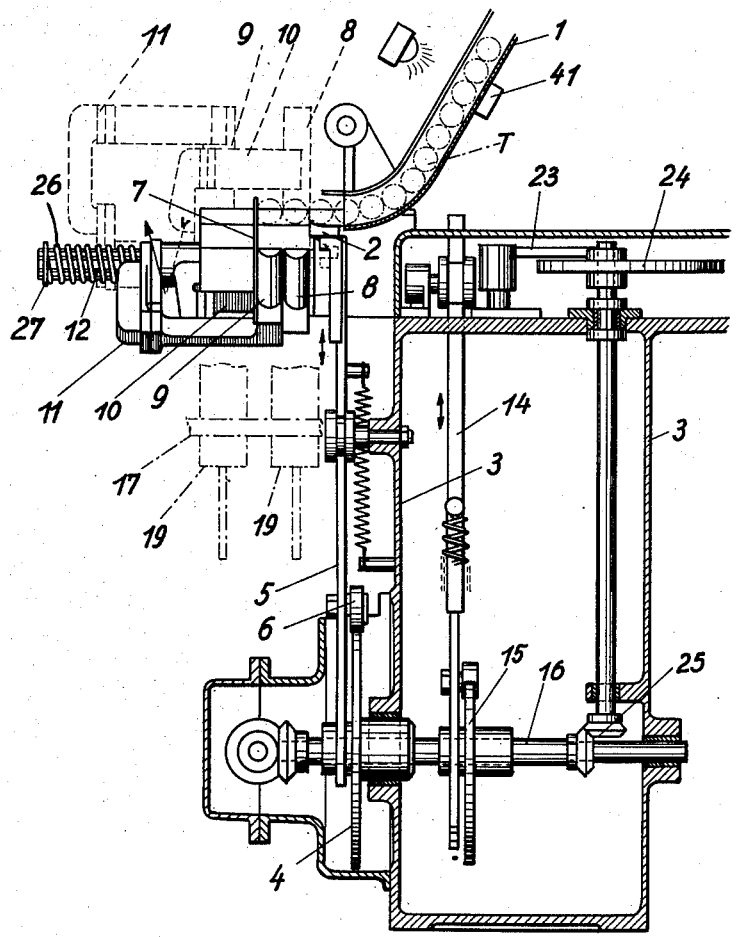

INVENTOR
Rudolf Anger
BY Richards & Geier
ATTORNEYS

Nov. 24, 1959    R. ANGER    2,914,162
DEVICE FOR THE FEEDING OF TUBES TO AND FOR THE REMOVAL
OF TUBES FROM A TUBE-VARNISHING-MACHINE
Filed Feb. 10, 1958    9 Sheets-Sheet 7

INVENTOR
Rudolf Anger
BY
ATTORNEYS

Nov. 24, 1959 R. ANGER 2,914,162
DEVICE FOR THE FEEDING OF TUBES TO AND FOR THE REMOVAL
OF TUBES FROM A TUBE-VARNISHING-MACHINE
Filed Feb. 10, 1958

INVENTOR
Rudolf Anger
BY
ATTORNEYS

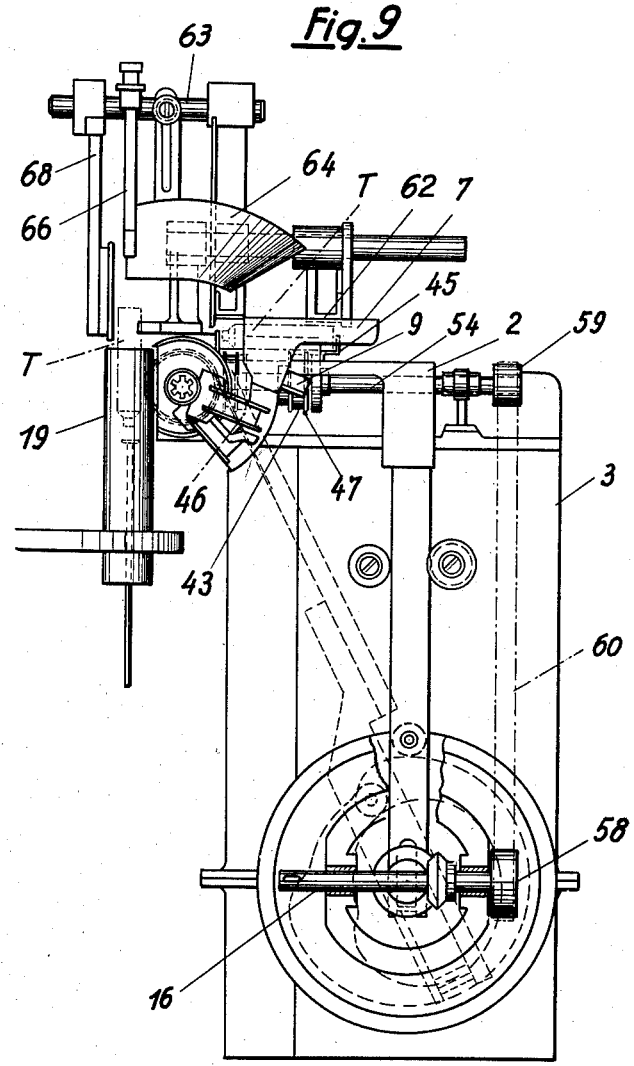

United States Patent Office 2,914,162
Patented Nov. 24, 1959

2,914,162

DEVICE FOR THE FEEDING OF TUBES TO AND FOR THE REMOVAL OF TUBES FROM A TUBE-VARNISHING-MACHINE

Rudolf Anger, Kirchheim, Teck, Germany, assignor to Sprimag Spritzmaschinenbau G.m.b.H., Kirchheim, Teck, Germany Application February 10, 1958, Serial No. 714,330

Claims priority, application Germany February 13, 1957

12 Claims. (Cl. 198—33)

This invention relates to a device for the feeding of tubes to and for the removal of tubes from a tube-varnishing-machine.

The inner varnishing of all kinds of tubes is nowadays carried out usually by machines having an intermittently rotating conveying disk or the like provided with a plurality of supporting cylinders suitably constructed to accommodate the tubes and adapted for rotation about their vertical axis. The varnishing of the tubes is then effected by means of a longitudinally shiftable spraying nozzle introduced from above into the rotating tubes and which progressively provides the entire inner surface of the tubes with a coat of varnish. In order to obtain, in spite of these comparatively time-consuming proceedings sufficiently satisfactory results it has already been proposed to provide at the machine a plurality of such spraying nozzles, so that at a working operation two or more tubes are treated simultaneously.

Until now the feeding of the tubes to the supporting cylinders and the removal of the tubes from the supporting cylinders was effected by separate operators, so that the result produced by the two people was identical with the result achieved by the entire machine.

This feeding and discharge work done by hand results naturally also in an increased cost of operation for the manufacture of the tubes, and in addition to that has the further disadvantage that continuously a smaller or larger percentage of waste is produced by the fact that the thin and soft and therefore very pressure-sensitive tubes easily get crushed when passing through the hands of the workers, and then are not fit for further handling by machinery.

According to the invention these disadvantages are eliminated by the features that the tubes are fed or conveyed while being positioned in pairs or in a plurality of units horizontally directly beside one another on a conveying path or track to a plurality of tilting troughs tilting the tubes jointly during the operating cycle of the machine from their original horizontal position into a vertical position and enlarging thereby simultaneously the distance between the tubes to such an extent and in such a way that at the end of the tilting movement the tubes are positioned vertically directly above the supporting cylinders of the conveying disk and then are permitted to slip into them, whereupon after the varnishing has been effected the tubes are displaced by lifting means extending across two or more supporting cylinders simultaneously in an upward direction out of the supporting cylinders and are pushed into a corresponding number of transfer cases which swing the tubes out of the area of the supporting cylinders and cause them to slide into a conveying chute.

By means of a machine of this kind the feeding into and the removal or discharge of the tubes from the machine is effected fully automatically, while simultaneously a careful treatment of the tubes is provided, so that in spite of a considerably increased capacity no waste through compression is produced.

Figure 2:
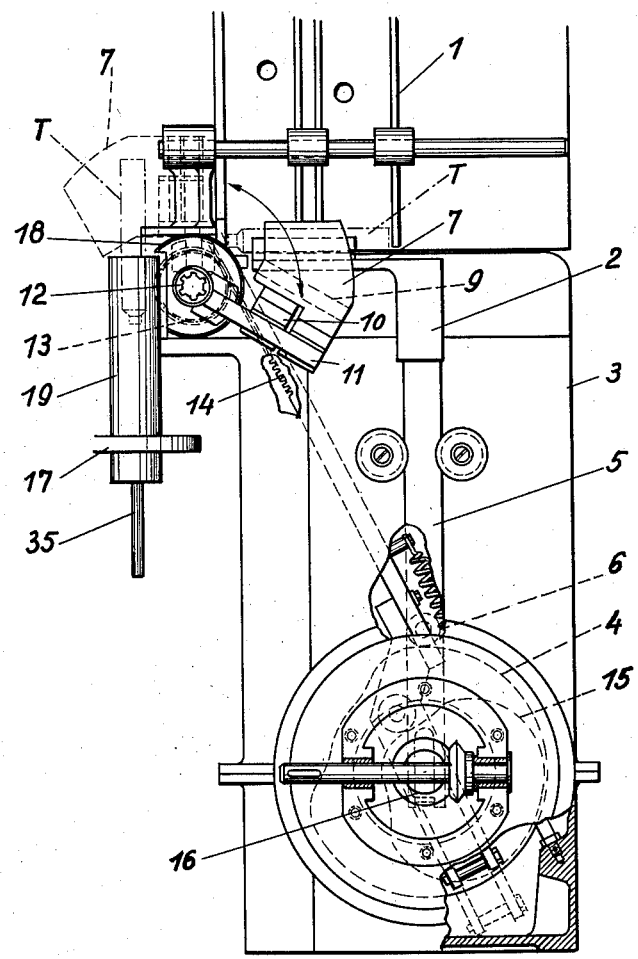
Figure 3:
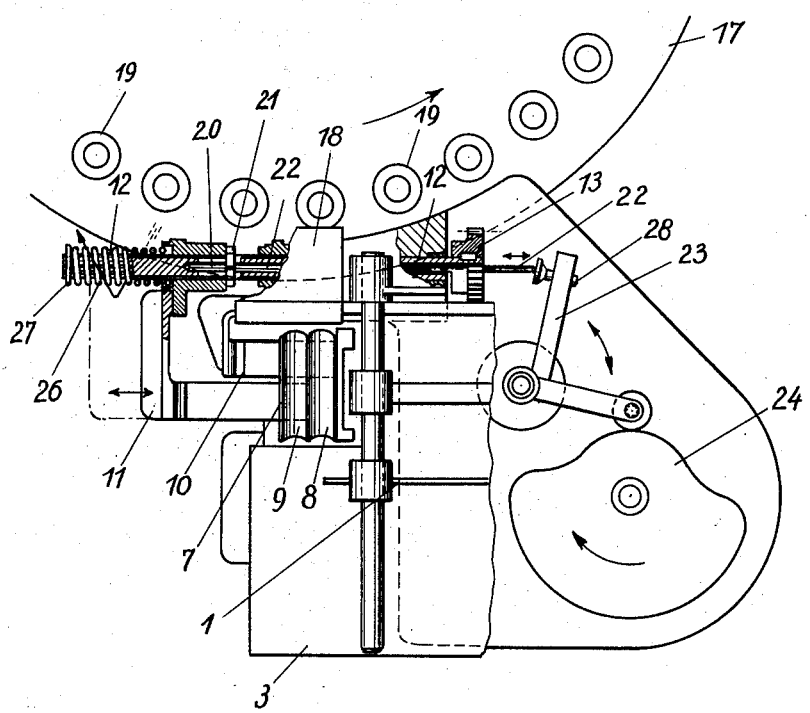
Figure 4:
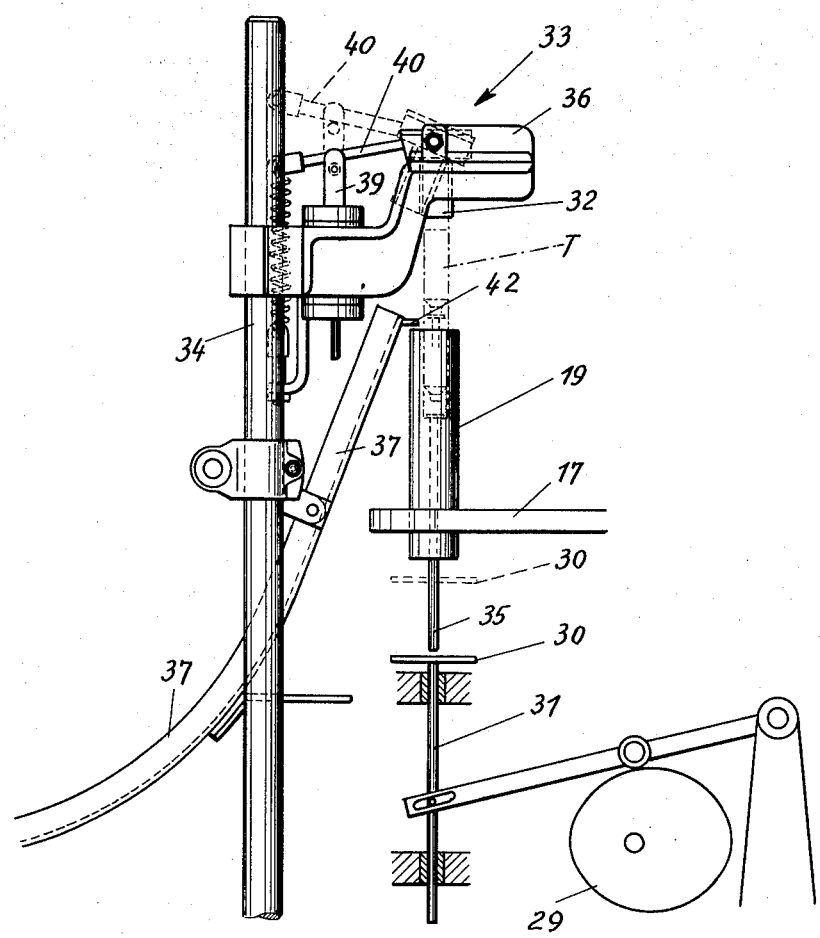
Figure 5:
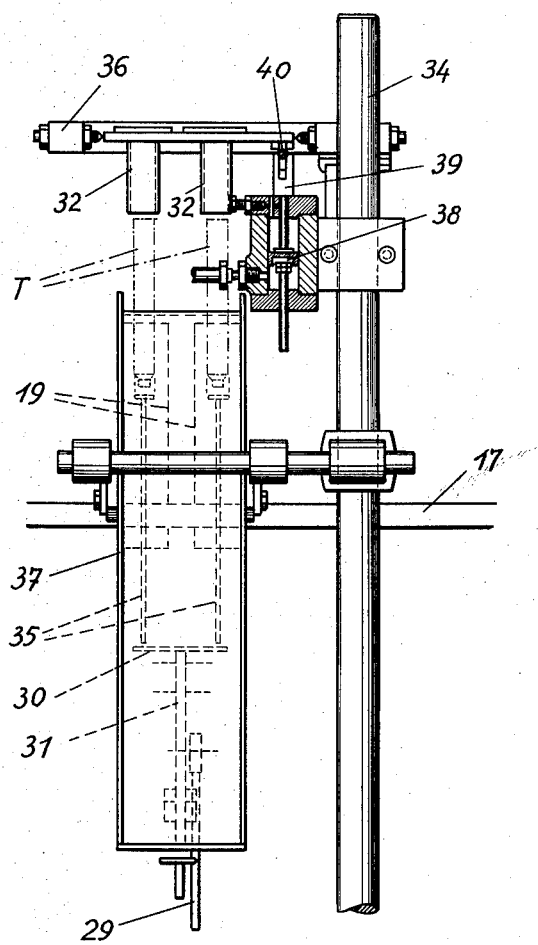
Figure 6:
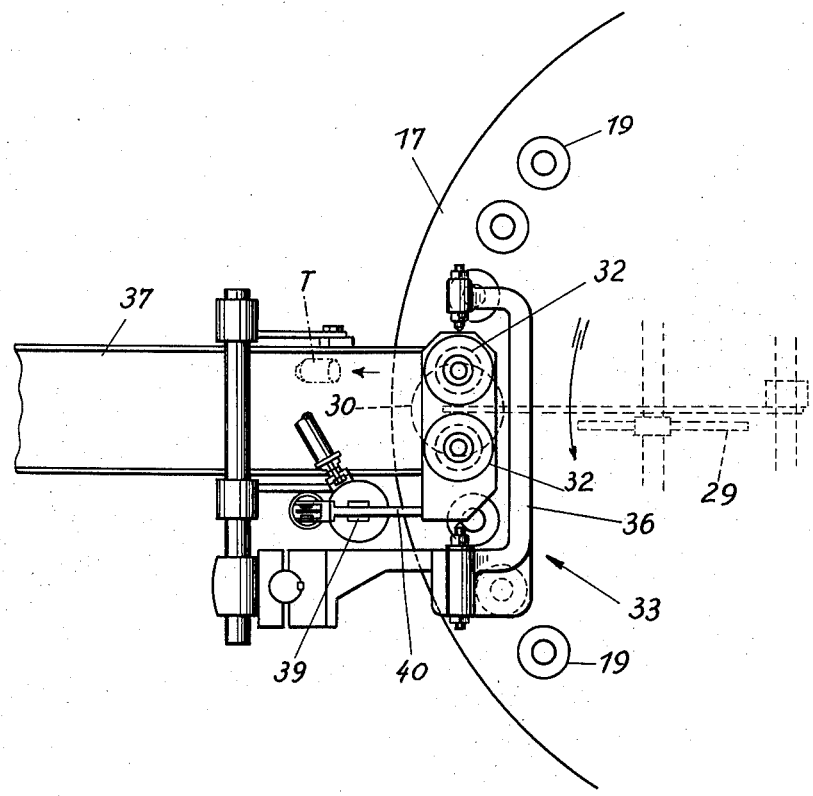
Figure 7:
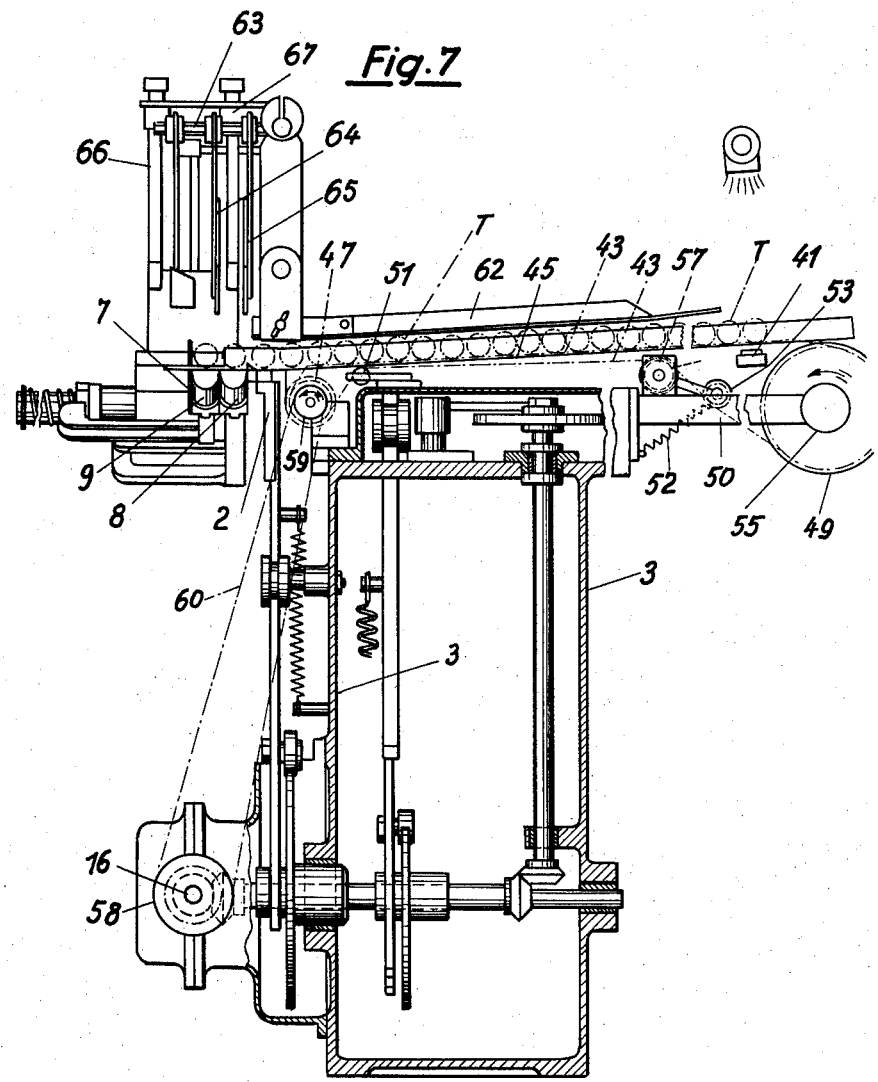
Figure 8:
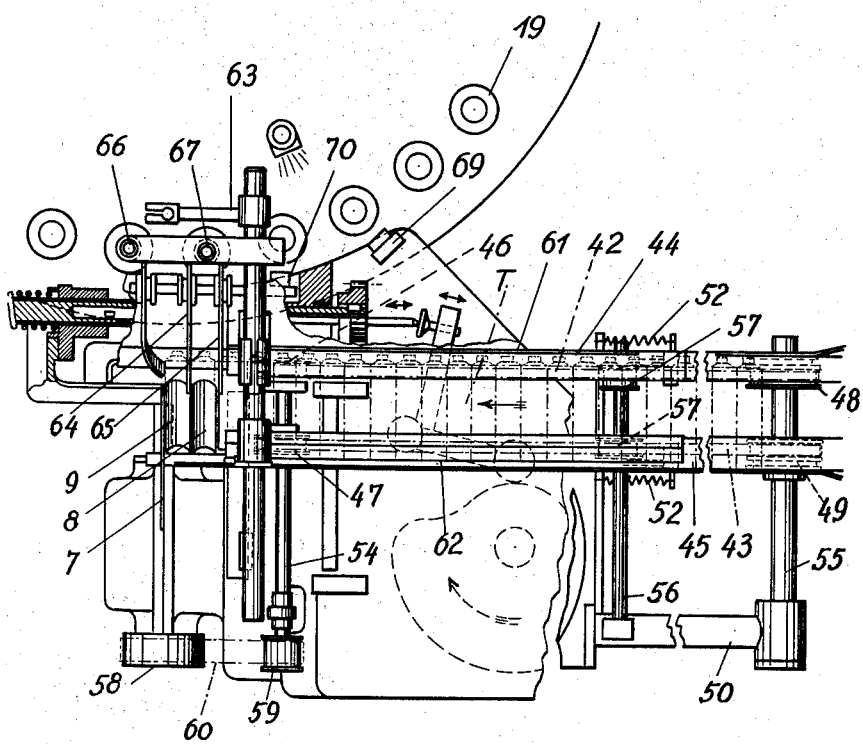

In the drawings, in which like parts are referred to by the same reference numerals:

Fig. 1 is a front view of the feeding means of the machine;
Fig. 2 is a side view of the feeding means;
Fig. 3 is a top plan view of the feeding means;
Fig. 4 is a side view of the discharge means of the machine;
Fig. 5 is a front view of the discharge means;
Fig. 6 is a top plan view of the discharge means;
Fig. 7 is a front view of the feeding means of a second form of construction of the machine;
Fig. 8 is a bottom plan view of the feeding means of Fig. 7;
Fig. 9 is a side view of the feeding means of Figs. 7 and 8.

The tubes are fed by means of a feeding device, for example an inclined conveying path or track 1, whereby the tubes are arranged in a row one next to the other. In this way the tubes roll first to a stop 2 provided at the end of the conveying track 1. The stop 2 is supported in the machine frame 3 and adapted for adjustment in vertical direction. The movements of the stop 2 are controlled in conformity with the operation cycle of the varnishing machine by means of a cam 4 which acts upon a roll 6 supported at the guide bar 5.

When the stop 2 moves down, the tubes T continue to roll on as far as a stop 7 secured to one of two tilting troughs 8 and 9 positioned directly beside each other. The troughs 8 and 9, which in their starting position are located beneath the end of the conveying track 1, are fastened to two tilting levers which in their turn are secured to a spline shaft 12. Positioned at the end of this spline shaft 12 is a pinion 13, which is in mesh with a rack 14, which by means of another cam 15 mounted on the common driving shaft 16 is caused to perform reciprocating movements. These movements of the rack 14 result in the tilting of the two tilting troughs 8 and 9, which carry the two most advanced tubes T separated from the rest of the tubes T by the upward moving stop 2 and tilt the tubes into a vertical position, from where they slip into the openings of the supporting cylinders 19 providing on the conveying disk 17. In order to prevent the tubes from slipping down from the troughs 8 and 9 too early there has been provided a guide member 18 of substantially cylindrical shape against which the tubes come to rest during the tilting movement.

However, the distance of the supporting cylinders 19 from one another is in every case larger than the distance between the tubes T positioned in the troughs. It is necessary, therefore, to space the tubes apart during the tilting movement in conformity with the distance between the supporting cylinders, in order to make it possible for them to slip into the supporting cylinders which are ready to receive them. That is the reason why the tilting lever 11 of the left-hand tilting trough, namely, of the forward tilting trough 9, is shiftably mounted on the spline shaft 12 for shifting in the longitudinal direction of the spline shaft, and why the spline shaft is provided with a slot 20 through which extends a pressure member 21 which comes to rest against the tilting lever 11. The pressure member 21 is secured to a pressure pin 22 guided within the shaft 12; and the movements of the pressure pin 22 are controlled by a cam 24 through an angle lever 23. The cam 24 is driven by a bevel gear drive 25 likewise from a common drive shaft 16. The rotation of the cam 24 results in the shifting of the pressure pin 22, and consequently also of the tilting lever 11 against the resistance of a return spring 26 positioned between the tilting lever 11 and the stop ring 27 provided at the end of the spline shaft 12. The controlling or operating means of the pressure pin 22 are so adjusted that the shifting of the tilting lever 11 always begins at the moment when the two tilting troughs 8 and 9 have grasped the two foremost tubes. Provided between the pressure pin 22 and the angle lever 23 is an adjusting means, for example an adjusting screw 28, by means of which the final position of the tilting troughs 8 and 9 can be adjusted accurately to the distance of the supporting cylinders from one another.

In some cases, for example when the tubes to be fed are of too soft a material, it may happen that the descent of the inclined conveying track 1 does not suffice to reliably convey the tubes into the tilting troughs 8 and 9 and that, consequently, the operation of the machine may be disturbed. For tubes of this kind the invention provides a feed or dispatch arrangement as illustrated in Figs. 7 to 9.

In this construction the tubes T are fed by means of two conveying belts 42 and 43 travelling parallel to each other beside each other, and which are guided on two guide bars 44 and 45 to the tilting troughs 8 and 9, positioned in substantially the same plane, which transfer the tubes from their horizontal position into a vertical position, and which simultaneously space the tubes apart in such a way that the distance between the tubes corresponds to the distance between the supporting cylinders 19 of the spray-varnishing-machine.

The two feed belts 42 and 43 pass over a pair of driving rollers 46, 47 arranged at upper part of the machine frame 3, as well as over a pair of guide rollers 48, 49 positioned at the outer end of the bars 44 and 45 at a special support 50. For the further guidance of the conveying belts there is used a pair of guide rollers 51 as well as a pair of tensioning rollers 53 operating against the resistance of springs 52 and an additional pair of guide rollers 57.

In order to be able to adjust the distance of the two feed belts 42 and 43 relatively to each other, the pair of driving rollers 46, 47; the pair of guide rollers 49, 48; and the pair of tensioning rollers 53 together with the pair of guide rollers 57; are arranged on common shafts 54, 55 and 56, respectively, in such a way that in each case one roller of the pair of rollers is shiftably or displaceably seated on the respective shaft.

The actuation of the conveying belts 42 and 43 is effected from the common driving shaft 16 of the machine. That is the reason why upon the driving shaft 16 and upon the shaft 54 of the driving rollers 46 and 47 a pulley 58 or 59, respectively, is arranged said pulleys being connected with each other by a belt 60.

In order to make it impossible for the tubes T located upon the conveying belts 42 and 43 to mutually dislodge one another in upward direction when running against the stop 2 positioned in front of the tilting troughs 8 and 9, there are arranged above the guide bars 44 and 45 two cover bars 61 and 62 which are adjustably secured to a supporting frame 63 mounted on the machine frame 3. Provided at this supporting frame 63 are two further guide plates 64 and 65 for the guidance of the tubes T tilted upward by the tilting troughs, as well as two compressed air nozzles 66 and 67 which aid the dropping down of the upwardly tilted tubes into the supporting cylinders 19 by an air pressure current. The control of the air pressure current is effected in known manner in conformity with the timed operation of the machine.

Possible disorderly dropping of the tubes T from the tilting troughs 8 and 9 into the supporting cylinders 19 is prevented without difficulty by a guide plate 68 fastened in vertical direction to the guide plates 64 and 65 at the supporting frame 63.

After the tubes fed into the machine have been varnished they are conveyed by the conveying movement of the conveying disk to the discharge apparatus of the conveying and discharge device illustrated in Figs. 4 to 6. This part of the machine consists essentially of a lifter 31 provided with a plate or disk 30, positioned beneath the conveying disk 17 and likewise actuated by a cam 29, and of a transfer device 33 provided with two tiltable cases 32 corresponding to the diameter of the tubes T and secured to a support 34 above the conveying disk 17.

The disk 30 of the lifter 31 presses, when moving upward, against the ejectors 35 of two supporting cylinders 19 and thus displaces simultaneously two tubes in upward direction into the cases 32 tiltably supported in a support 36 of the transfer device 33. After the tubes T have been completely pushed out of the cylinders 19, the tilting cases 32 tilt them in outward direction and transfer the tubes to a chute 37 (likewise secured to the support 34) into which the tubes slide for subsequent conveyance to other places of treatment. Provided between the entering end of the chute and the discharge end of the cylinder 19 is a flap 42 which is bent out of the material of the chute 37 and which serves as a guiding means for the tubes.

The tilting movement of the cases 32 is effected pneumatically by means of a piston 38, whose piston rod 39 engages at a lever arm 40 connected to the tilting cases 32.

The actuation of the tilting cases 32 might also be effected hydraulically, mechanically or electro-mechanically, for example by means of an electro-magnet. For fully automatic operation there might be provided at the conveying path or track 1 or at the conveying belts 42, 43, a tracer, for example a photo-electric cell 41 which, when additional tubes are lacking, actuates an alarm device or brings the machine to a stop.

Furthermore, there may be arranged directly behind the pass-over place of the tubes to the conveying disk 17 two photo-electric cells 69 and 70 (see Fig. 8) which are so adjusted and so connected that they automatically cause the machine to stop when additional tubes are missing in the supporting cylinders 19.

The reliable discharge or removal of the tubes may also be secured similar to the way illustrated for the device of Figs. 7 to 9 by the provision of blow-nozzles. For this purpose there are provided above the discharge means a plurality of blow-nozzles in conformity with the number of tubes to be discharged, which blow-nozzles then ensure and speed up the discharge of the tubes.

The construction of the feed and discharge device is naturally not restricted to the embodiment described and illustrated in this specification, but may be changed or modified, so long as such changes or modifications constitute no material departure from the salient features of the invention as expressed in the appending claims. It is possible, for example, to feed at a time simultaneously three or more tubes, and to discharge three or more tubes likewise simultaneously at a time. It is further possible to effect the lateral shifting of the tilting troughs by other machine elements, for example screw rods or the like.

What I claim as new and desire to secure by Letters Patent of the United States is:

1. Device for the feeding of tubes to and for the removal of tubes from a tube-varnishing-machine provided with an intermittently rotating conveying disk equipped with supporting cylinders for the reception and support of the tubes, an inclined guide track adapted to guide the tubes horizontally, said tubes being arranged beside one another; a plurality of tilting troughs located when in their position of rest directly beside one another beneath the lower end of the guide track and adapted to receive the tubes; a separate tilting lever secured to each of said plurality of tilting troughs, said tilting levers being secured for their operation to a common shaft and adapted to space apart said tilting troughs with the tubes positioned in them to such an extent that the distance between the troughs corresponds to the distance between said supporting cylinders on said conveying disk and to simultaneously tilt said troughs from a horizontal to a vertical position and into a position directly above adjacent supporting cylinders on said conveying disk, causing thereby said tubes to slip into the openings of said supporting cylinders; a plurality of lifting members arranged beneath said conveying disk and adapted to simultaneously push varnished tubes out of the respective cylinders; a plurality of transfer members arranged above said cylinders and adapted to receive the tubes pushed out of the cylinders and to swing them out of the area of the cylinders; and a chute arranged close to the cylinders and adapted to receive the tubes swung out of the area of the cylinders.

2. Device as specified in claim 1, including a shiftable pressure pin guided within said common shaft and provided at one end with a pressure plate bearing against the tilting lever secured to the forward one of said tilting troughs and adapted to space said tilting troughs apart; and a cam acting upon an angle lever and adapted to shift said pressure pin by means of said angle lever forward and backward.

3. Device as specified in claim 1, including stop means arranged beneath the lower end of the guide track directly before said tilting troughs and adapted to lock the tubes on the track in position while the tilting by means of the tilting troughs is taking place.

4. Device as specified in claim 1, including for the control of the movements of said tilting troughs a cam adapted to act by means of a rack upon a pinion secured to the aforesaid common shaft.

5. Device as specified in claim 1, in which said guide track for the guidance of the tubes to the tilting troughs consists of a pair of parallel conveying belts guided on a pair of guide bars positioned in approximately the same plane as the tilting troughs; driving means adapted for the continuous actuation of said conveying belts in such manner that the tubes are continuously conveyed in the direction of the tilting troughs; and stop means for the tubes positioned directly in front of the tilting troughs and adapted to stop the forward movement of the tubes while the tilting by means of the tilting troughs is taking place.

6. Device as specified in claim 1, in which said transfer members are tiltably secured in supporting means therefor; and including a pneumatically actuated pressure piston connected with said transfer members and adapted to tilt said transfer members according to requirements.

7. Device as specified in claim 1, including a shiftable ejector positioned in each of said supporting cylinders and provided with an ejecting rod projecting from the cylinders in a downward direction.

8. Device as specified in claim 1, including a shiftable ejector positioned in each of said supporting cylinders and provided with an ejecting rod projecting from the cylinders in a downward direction; and including further a lifter provided with a lifting disk positioned beneath said ejector and operable by a cam and adapted to lift said ejector for the ejection of the tube.

9. Device as specified in claim 1, including a plurality of compressed air nozzles arranged above the supporting cylinders and at a distance from one another corresponding to that of the supporting cylinders from each other and adapted to aid the drop-movement into the supporting cylinders of the tubes tilted upward by the tilting troughs.

10. Device as specified in claim 1, including a plurality of guide plates arranged above the tilting troughs and adapted to guide the upwardly tilted tubes, as well as another guide plate arranged vertically relatively to the aforesaid guide plates and adapted to guide the downwardly slipping tubes into the supporting cylinders.

11. Device as specified in claim 1, including a plurality of compressed air nozzles arranged above the supporting cylinders and at a distance from one another corresponding to that of the supporting cylinders from one another and adapted to aid the drop-movement into the supporting cylinders of the tubes tilted upward by the tilting troughs; and including further a plurality of guide plates arranged above the tilting troughs and adapted to guide the upwardly tilted tubes, as well as another guide plate arranged vertically relatively to the aforesaid guide plates and adapted to guide the downwardly slipping tubes into the supporting cylinders; said compresed air nozzles and said guide plates being arranged in a supporting frame mounted on the machine frame.

12. Device as specified in claim 1, in which said plurality of transfer members as well as said chute are supported at a common supporting pole therefor positioned beside the conveying disk.

References Cited in the file of this patent

UNITED STATES PATENTS 611,364     Holden _____ Sept. 27, 1898